US009282044B2

(12) United States Patent
Ibasco et al.

(10) Patent No.: US 9,282,044 B2
(45) Date of Patent: Mar. 8, 2016

(54) SYSTEM AND METHOD FOR ROUTING ELECTRONIC CONTENT TO A RECIPIENT DEVICE

(75) Inventors: Alex D. Ibasco, Paranaque (PH); Eduardo Ramon G. Joson, Quezon (PH); William Emmanuel S. Yu, Pasay (PH); Manuel O. Diaz, Jr., Camarines Sur (PH)

(73) Assignee: EINNOVATIONS HOLDINGS PTE. LTD., Singapore (SG)

( * ) Notice: Subject to any disclaimer, the term of this patent is extended or adjusted under 35 U.S.C. 154(b) by 68 days.

(21) Appl. No.: 14/117,020

(22) PCT Filed: May 9, 2012

(86) PCT No.: PCT/SG2012/000162
§ 371 (c)(1),
(2), (4) Date: Mar. 21, 2014

(87) PCT Pub. No.: WO2012/154127
PCT Pub. Date: Nov. 15, 2012

(65) Prior Publication Data
US 2014/0293788 A1  Oct. 2, 2014

(30) Foreign Application Priority Data

May 11, 2011  (SG) .................................. 201103365

(51) Int. Cl.
*G01R 31/08* (2006.01)
*H04L 12/803* (2013.01)
(Continued)

(52) U.S. Cl.
CPC .......... *H04L 47/122* (2013.01); *H04L 12/5855* (2013.01); *H04L 45/28* (2013.01);
(Continued)

(58) Field of Classification Search
CPC ....... H04L 47/122; H04L 45/28; H04L 47/12; H04L 47/17; H04L 12/5855; H04L 67/2842; H04L 45/308; H04L 47/32; H04W 40/18; H04W 4/12; H04W 24/08
See application file for complete search history.

(56) References Cited

U.S. PATENT DOCUMENTS 5,128,932 A * 7/1992 Li .................................. 370/236
5,253,248 A * 10/1993 Dravida et al. ............... 370/228
(Continued)

FOREIGN PATENT DOCUMENTS

CN       101902776       12/2010
EP       1 944 908 A1    3/2008

OTHER PUBLICATIONS

Supplementary European Search Report, mailing date Aug. 22, 2014 for corresponding International Application No. PCT/SG2012/000162.

*Primary Examiner* — Jung-Jen Liu
(74) *Attorney, Agent, or Firm* — Intellectual Property Law Group LLP

(57) ABSTRACT

A system and method for routing electronic content to a recipient device comprising a plurality of network nodes, each network node adapted to receive and forward electronic content and an activity profile server adapted to be in data communication with each network node, the activity profile server adapted to monitor the activity level of each network node and inform each network node on the congestion level of an adjacent network node; wherein each network node is adapted, on receiving the information on congestion level to store electronic content if the adjacent network node is congested and forward the electronic content to the adjacent network node if the adjacent network node is not congested is disclosed.

20 Claims, 3 Drawing Sheets

(51) Int. Cl.
*H04W 4/12* (2009.01)
*H04L 12/801* (2013.01)
*H04L 12/823* (2013.01)
*H04L 12/725* (2013.01)
*H04W 24/08* (2009.01)
*H04L 12/58* (2006.01)
*H04L 12/703* (2013.01)
*H04L 29/08* (2006.01)
*H04W 40/18* (2009.01)

(52) U.S. Cl.
CPC ............ *H04L 45/308* (2013.01); *H04L 47/12* (2013.01); *H04L 47/17* (2013.01); *H04L 47/32* (2013.01); *H04W 4/12* (2013.01); *H04W 24/08* (2013.01); *H04L 67/2842* (2013.01); *H04W 40/18* (2013.01)

(56) References Cited

U.S. PATENT DOCUMENTS

| | | |
|---|---|---|
| 2002/0118641 A1 | 8/2002 | Kobayashi |
| 2003/0009560 A1* | 1/2003 | Venkitaraman et al. ...... 709/226 |
| 2004/0230345 A1* | 11/2004 | Tzamaloukas .................... 701/1 |
| 2006/0035633 A1 | 2/2006 | Harris et al. |
| 2006/0187840 A1* | 8/2006 | Cuffaro et al. ................ 370/235 |
| 2007/0147264 A1 | 6/2007 | Zolfaghari et al. |
| 2007/0153695 A1* | 7/2007 | Gholmieh et al. ............ 370/235 |
| 2008/0298251 A1 | 12/2008 | Khuu et al. |
| 2009/0274047 A1* | 11/2009 | Kruys et al. .................. 370/236 |
| 2010/0278042 A1 | 11/2010 | Monnes |
| 2011/0044169 A1* | 2/2011 | Liu ................................ 370/235 |
| 2011/0106627 A1 | 5/2011 | LeBoeuf et al. |
| 2011/0199905 A1* | 8/2011 | Pinheiro et al. ............. 370/235 |
| 2011/0305139 A1* | 12/2011 | Kwak et al. .................. 370/230 |
| 2012/0163199 A1* | 6/2012 | Marbach et al. ............. 370/252 |

\* cited by examiner

US 9,282,044 B2

SYSTEM AND METHOD FOR ROUTING ELECTRONIC CONTENT TO A RECIPIENT DEVICE

CROSS-REFERENCE TO RELATED APPLICATIONS

The present application is a U.S. National Stage entry under 35 U.S.C. §371 of International Application No. PCT/SG2012/000162, filed on 9 May 2012, which claims benefit of Singapore Application No. 201103365-1, filed on 11 May 2011, which is hereby incorporated by reference in its entirety.

FIELD OF THE INVENTION

The present invention relates to a system and method of routing electronic content to a recipient device. The invention is particularly suited, but not exclusive to mobile networks and transmission of electronic content such as SMS, data packets etc between different mobile device users.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

A mobile user using known SMS or MMS system to send an electronic message typically has no control of when the receiver receives the message. The message is typically received real time unless there is unexpected network congestion. While most people demand real-time messaging under many situations, there are times where such real-time delivery is undesirable, e.g. when the message is sent very early or late in the day.

Further, most known congestion control routing algorithms are reactive, i.e. they are triggered on demand, such as when main route congestion is detected. There is thus no pre-emptive scheduled congestion control routing algorithm. On the other hand, most scheduled data transmission does not include congestion control.

In addition, while most congestion control routing algorithms are typically node based, i.e. the congestion control algorithm focuses on each network node activity; the routing algorithms do not usually factor in the terminal destination, i.e. recipient device. In a base-station based wireless telecommunication network environment, for instance, while routing is performed from end-to-end, congestion control focuses on the nodes to avoid congestion and assumes that the last leg delivery will be straightforward. Two limitations associated with such congestion control algorithms are:

a. When large amounts of data are to be delivered to the recipient device, current routing algorithms will allow delivery of data when there is no congestion detected on the network. However, delivery of large amounts of data could adversely affect the performance of the recipient device, despite the increasingly powerful processors available today. This can result in an unpleasant user experience.

b. Current routing algorithms are not concerned with the last leg of delivery, hence even if the recipient device is in active use (i.e. receiving or transmitting electronic content); current routing algorithms continue to effect delivery. This can also result in an unpleasant user experience.

While there are arguably routing algorithms which consider the activity level on the recipient devices, such routing algorithms typically adopt a marking and dropping of data packets when congestion is detected (i.e. all or nothing approach).

Although there are known routing system which schedule transmission of data packets at predetermined times, these routing systems do not take into consideration congestion levels of the network and size of the data packets.

The present invention seeks to alleviate or reduce the above mentioned drawbacks.

SUMMARY OF THE INVENTION

In accordance with a first aspect of the present invention there is provided a system for routing electronic content to a recipient device comprising a plurality of network nodes, each network node adapted to receive and forward electronic content and an activity profile server adapted to be in data communication with each network node, the activity profile server adapted to monitor the activity level of each network node and inform each network node on the congestion level of an adjacent network node;

wherein each network node is adapted, on receiving the information on congestion level to store electronic content if the adjacent network node is congested and forward the electronic content to the adjacent network node if the adjacent network node is not congested.

Preferably, the activity profile server is further adapted to monitor the activity level of the recipient device. The activity profile server may also be adapted to schedule a deferred delivery for the adjacent network node at a time period corresponding to a time period of low activity of the adjacent network node. In this regard, the deferred delivery is scheduled based on a profile of least congestion where a period of low activity could not be found.

Preferably, the recipient device is a mobile device. More preferably the recipient device comprises at least one gyroscopic sensor.

Alternatively, a deferred delivery is scheduled to the recipient device at a time period corresponding to a time period of idleness of the recipient device. The deferred delivery may be scheduled based on a period of low activity of the recipient device in the event where no period of idleness is found. The electronic content may also be broken into a plurality of smaller packets prior to scheduling for deferred forwarding.

In accordance with a second aspect of the present invention there is provided a method of routing electronic content to a recipient device within a network having a plurality of network nodes comprising receiving at a network node electronic content from a source;

Monitoring the activity level of each network node;

Informing each network node on the congestion level of the adjacent network node;

storing the received electronic content if an adjacent network node is congested and forwarding the electronic content to the adjacent network node if the adjacent network node is not congested.

Preferably, the step of monitoring the activity of each network node includes monitoring the activity level of the recipient device.

Preferably, the recipient device is a mobile device comprising at least one gyroscopic sensor.

Preferably, the method includes scheduling a deferred forwarding of the electronic content to the adjacent network node at a time period corresponding to a time period of low activity of the adjacent network node. In such an instance, the deferred forwarding may be scheduled based on a profile of least congestion where a period of low activity could not be found.

Alternatively, the method includes scheduling a deferred forwarding of the electronic content to the recipient device at a time period corresponding to a time period of idleness of the recipient device. In such an instance, the deferred forwarding may be scheduled based on a period of low activity of the recipient device in the event where no period of idleness is found. The electronic content may also be broken into a plurality of smaller packets prior to scheduling for deferred forwarding.

BRIEF DESCRIPTION OF THE DRAWINGS

The present invention will now be described, by way of illustrative example only, with reference to the accompanying drawings, of which.

DESCRIPTION OF EMBODIMENTS OF THE INVENTION

Figure 1:
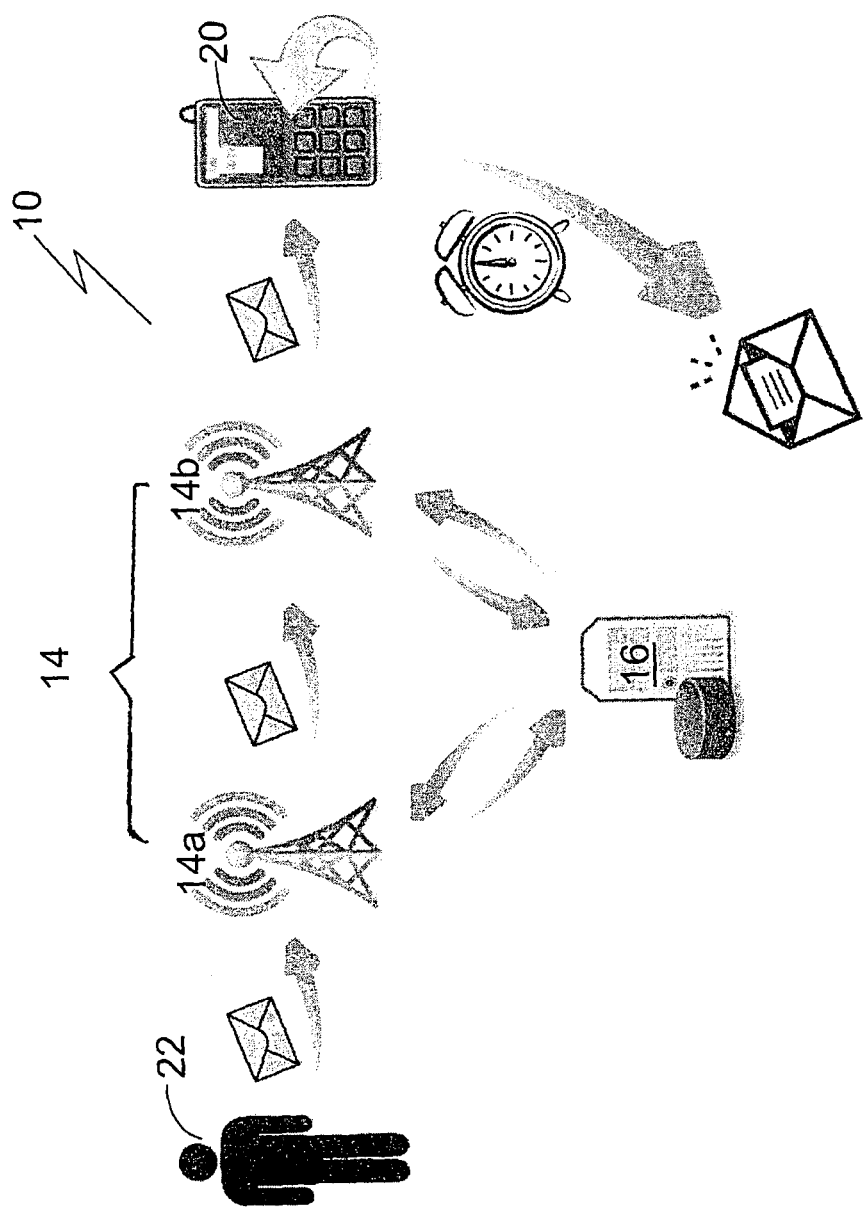
FIG. 1 is a schematic representation of a system for routing electronic content to a recipient device in accordance with an embodiment of the present invention.

In accordance with an embodiment of the invention there is a system 10 for routing electronic content to a recipient device 20. The system 10 comprises a network 12 having a plurality of network nodes 14 and an activity profile server 16.

The electronic content in the context of the embodiment may refer to the following: an electronic mail; regular/concatenated SMS (including SMS with metadata); MMS; other forms of extended/enhanced message; a data packet; software or firmware update etc. capable of being transmitted via a mobile device; or any other data.

Each network node 14 is in data communication with the activity profile server 16. Each network node 14 may be a base transceiver station (BTS) or a system coupled to a BTS. Each network node 14 is adapted, on receiving the electronic content from a previous network node 14 or from a sender device 22, to check the activity profile server 16 for the activity profile of the next network node 14. For the sake of clarity and illustration, the network nodes in FIG. 1 have been numbered 14a and 14b. They are, however, not to be construed as limitations to the number of network nodes in the system.

The activity profile server 16 comprises a database 24 which stores the traffic activity of each network node 14 in the form of an activity profile. The activity profile server 16 is adapted to provide a probability or likelihood of congestion of each network node 14 based on obtaining an appropriate historical utilization rate of each network node 14 from a network management system (NMS) or the non-peak usage times based on tracked revenue activities. In addition, activity profile server 16 further monitors the size of the electronic content entering each network node 14.

The recipient device 20 may be a mobile phone in the context of the embodiment. The recipient device 20 is capable of receiving the type of electronic content. For example, in the case where the electronic content is in the form of an SMS with metadata support, the recipient device 20 must support unpacking and rendering of the type of value-added service of a metadata enhanced SMS. The recipient mobile device 20 may further comprise integrated sensors such as gyroscopic sensors or pedometer which provides an indication of the user's activity.

The system 10 will next be described in the context of delivering an SMS with metadata from a sender device 22 to a recipient device 20. The process begins by a user of a sender device 22 composing a SMS message to recipient device 20. For purpose of illustration, the user of the sender device 22 wishes to defer the delivery of the SMS message to the recipient device 20 at a particular later time. The user can either select a first option where the SMS is resident in his or her mobile device 22 until the desired particular later appointed time or he/she can select a second option to forward the SMS message to a nearest network node 14a immediately.

Upon choosing the second option above, the SMS is forwarded to the nearest network node 14a, also known as the next hop. The nearest network node 14a queries the activity profile server 16 for the activity profile of the next network node 14b. If the activity profile database 16 indicates that the next network node 14b is congested, the nearest network node 14a may be configured to defer forwarding the SMS to the next network node 14b. The SMS is then forwarded to the next network node 14b at a later time corresponding to low probability of congestion based on checks with the activity profile database 16. The criteria determining 'low probability' of congestion may be based for example when the network activity falls below a minimum threshold of congestion level.

Assuming that the last network node is 14b, i.e. network node 14b is the receiving network node, wherein the next hop is to the recipient mobile device 20, the last network node 14b checks the activity profile database 16 of the recipient mobile device 20 and then forwards the SMS to the recipient mobile device 20 at the time determined by the activity profile database 16 to be its idle time or low activity period.

Regardless of the level of activity, should the SMS be below a certain threshold, e.g. of 140 bytes, which is the SMS size limit (per SMS), the SMS would be delivered.

Once the SMS is received by the recipient mobile device 20, the recipient mobile device 20 unpacks the SMS based on a check for the metadata. Upon unpacking the SMS, the recipient mobile device 20 is alerted to the message at the appointed time. The metadata may also be configured to unpack the SMS upon the occurrence of one or more of the following events:

a. External events—an integrated pedometer on the recipient mobile device 20 may cause a trigger once it has reached the count of a certain number of steps. An integrated gyroscopic sensor in the recipient device 20 may activate a trigger if it has detected a heavy activity.

Figure 2:
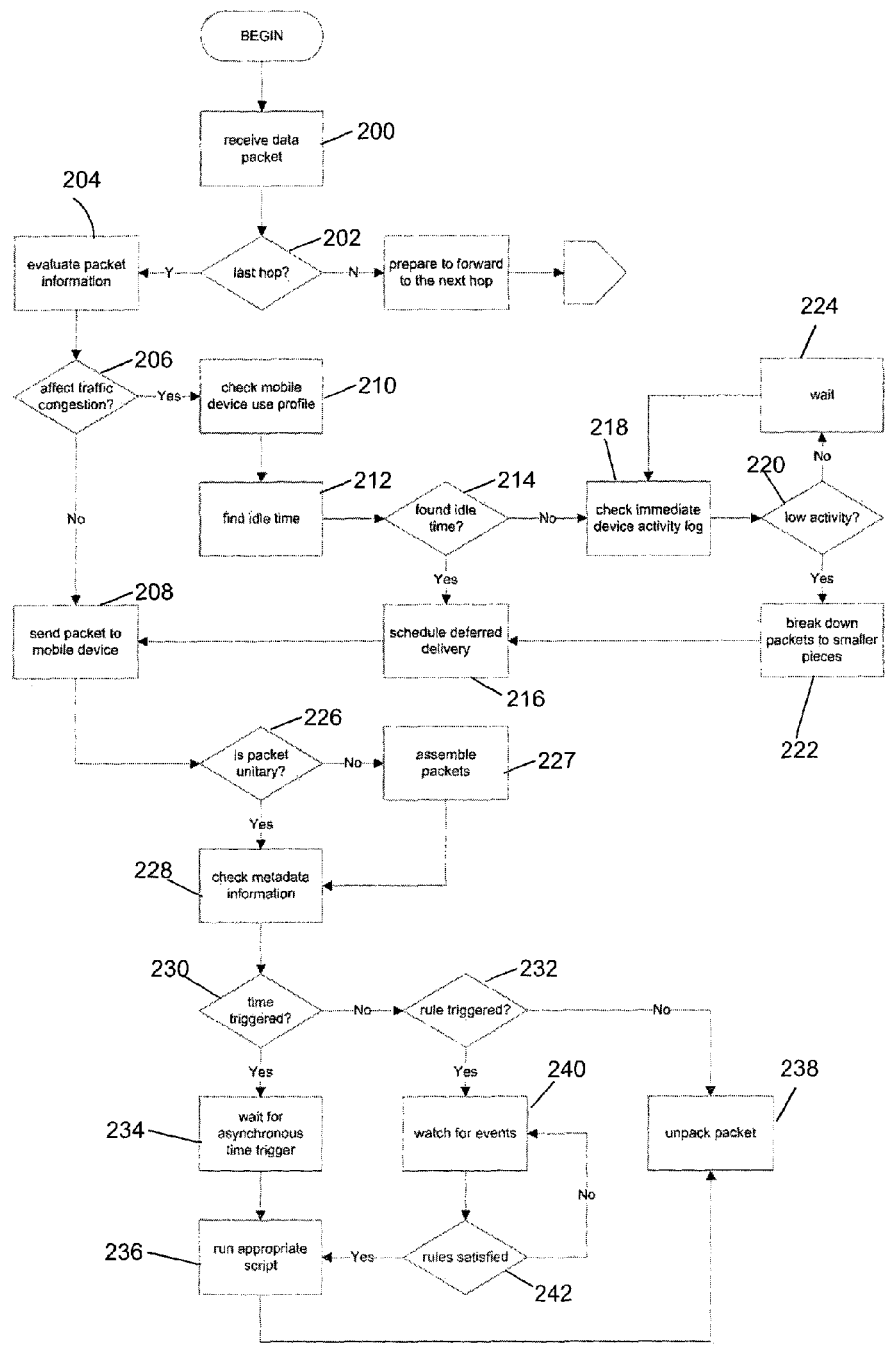
FIG. 2 is a flow diagram of the method of delivering an electronic content from the last network node to a recipient mobile device in accordance with the embodiment of the present invention.

The process of delivering the SMS from the last network node 14b to the recipient mobile device 20 is described as follows:

As shown in FIG. 2, upon receiving the SMS from the previous network node 14a (step 200), the receiving node 14b determines whether it is the last node or if there is a next node/hop (step 202). If it is determined that the network node 14b is the last hop, the data packet information is evaluated based on its file size to determine if there will be congestion (step 204). For example, if the data packet is of a file size of e.g. greater than 2 Mega Bytes (2 MB), the file size is checked by the activity profile server 16 to determine if it would result in the congestion of the recipient mobile device 20 once sent (step 206). If the sending of the data packet does not result in the congestion of the recipient mobile device 20, the data packet is sent to the recipient device 20 immediately (step 208). Otherwise, the recipient mobile device 20 is checked by the activity profile server 16 for idle moment (step 210), which is a period of no activity. Once an idle time period is identified (step 212), the activity profile server 16 locates the idle period (step 214) and the SMS is scheduled for deferred delivery coinciding with the identified idle period (step 216).

If at step 214 it is determined that an idle period could not be found, the activity profile server 16 checks the immediate use log of the recipient mobile device 20 to determine the possibility of immediate delivery (step 218). This is based on checking a period of low activity or low utilization on the recipient mobile device 20 (step 220), or synonymous to periods when the appropriate network node has low utilization based on its usage profile. If a period of low activity is found, the SMS packet is broken into smaller sub-packets (step 222) so that the delivery of these sub-packets will not affect the performance of the recipient mobile device 20 significantly, because typically when utilization is high, performance tends to be poor due to congestion. The sub-packets are then scheduled for deferred delivery (step 216).

However, if a period of low activity is not found, the activity profile server 16 waits to determine the possibility of immediate delivery until a period of low activity is detected (step 224).

Once the SMS packet is delivered to the recipient mobile device 20, the packet is checked by the activity profile server 16 if it is unitary (step 226), i.e. that it is a complete SMS. This may be done using methods such as checksums or cyclic redundancy check (CRC) and will not be further elaborated.

If the SMS is determined to be unitary, the header or metadata information is checked (step 228) for whether it includes a time trigger (step 230) or rule trigger (step 232). If not, the SMS packet is assembled (step 227).

If the metadata information includes a time trigger, the appropriate scripts are run and the SMS is unpacked at the appointed time (step 234, 236, and 238). If the metadata includes a rule-based trigger, i.e. triggered by an event rule, the triggering event is watched or polled (step 240) until the rule(s) are satisfied (step 242).

Figure 3:
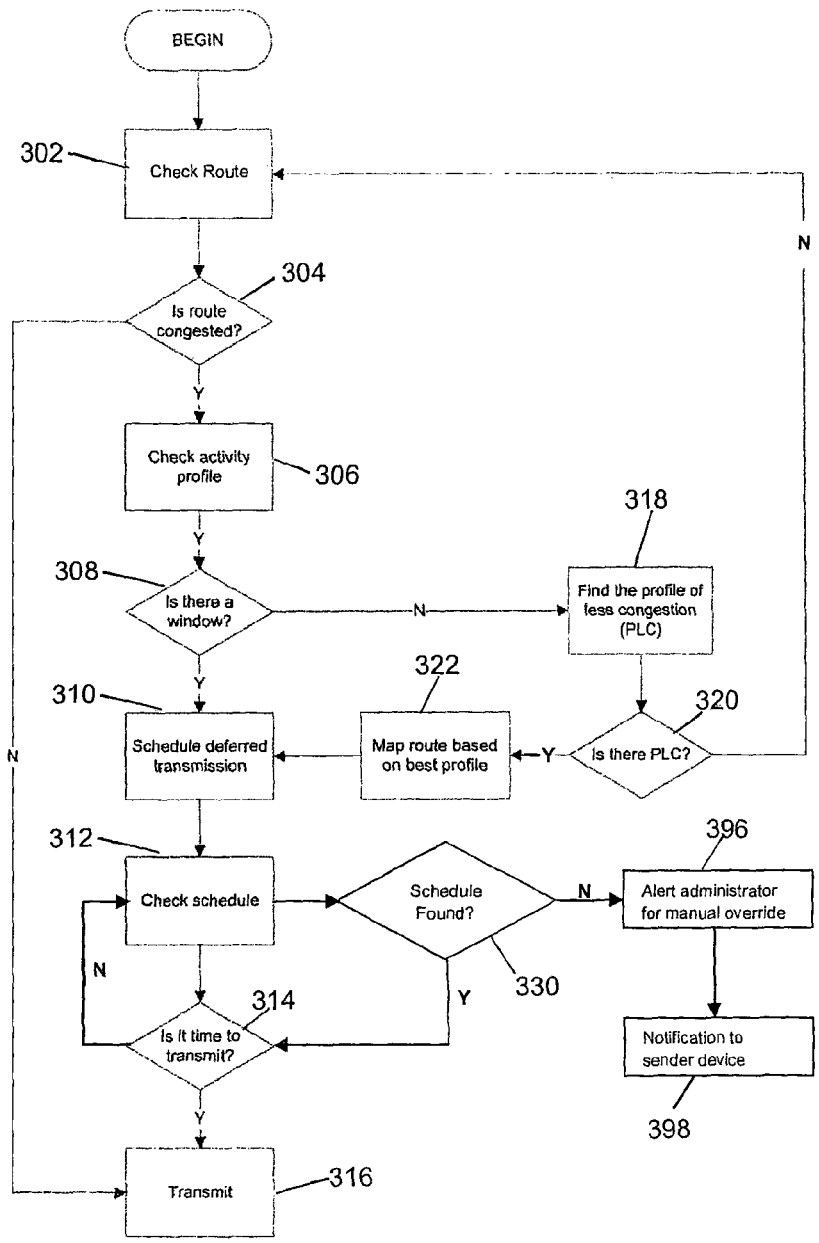
FIG. 3 is a flow diagram of the method of routing an electronic content from a source node to a recipient mobile device.

At step 202, if it is determined that the particular network node 14 is not the last node, i.e. if network node corresponds to node 14a, FIG. 3 describes the process of routing the data packet from the origin to the last node. As illustrated in FIG. 3, the process begins with the network node 14a locating the next network node 14b (step 302) and determining whether the node 14b is congested (step 304). If the node 14b is determined not to be congested, transmission is initiated by node 14a to node 14b (step 316).

If congestion is detected, the activity profile of node 14b is checked (step 306) to determine if there is a window or period of time which is shown to be low or idle use (step 308) for node 14b. If such a window is found, deferred transmission is scheduled (step 310) and checks on the schedule are performed (step 312) If it is the appointed time for transmission of the data packet (step 314), the data packet is transmitted (step 316), else check(s) on the schedule (step 312) are asynchronously performed in the form of asynchronous triggers until the appointed time for transmission of the data packet (step 316).

At step 312, the system also checks if a schedule is present (step 330). In the event where no schedule, an alert will be sent to the administrator for manual intervention (step 396) or override. An administrator will then manually find a route for the SMS packet or reject the SMS packet. A notification is sent to the sender device 22 accordingly (step 398).

Additional checks may be made at step 302 and 320 (not shown) to determine if there are remaining routes. If there are no remaining routes an alert may be sent to the administrator for manual intervention (step 396).

If at step 308, there is no window or period of time shown to be low or idle use found, the activity profile server 16 proceeds to locate other adjacent nodes 14 for a profile of less congestion (step 318) and determine if such a profile could be found in the system (step 320). If the profile of less congestion (PLC) is not found, the data packet proceeds back to the process from step 302. If however a PLC is found, the system proceeds to reroute the data packet to the adjacent node using a profile of least chance of congestion (or the best available profile)—Step 322. Actual transmission of the data packet is then deferred and scheduled (step 310).

The described invention possesses the following advantages:

The invention does not require a synchronized timeline, and while operation control may be triggered by an asynchronous event, it is not always the case.

This invention addresses the above problem by making the last leg of delivery only at such times when the device is idle or activity is minimal.

It is to be understood that the above embodiments have been provided only by way of exemplification of this invention, such as those detailed below, and that further modifications and improvements thereto, as would be apparent to persons skilled in the relevant art, are deemed to fall within the broad scope and ambit of the present invention described:

- The routing algorithm may be replaced by routing algorithms such as routing algorithms based on resources available on the network. For example, the electronic content may be sent during off-peak hours as a routing decision. Another option is to deliver the electronic content when the recipient device is detected to be 'camping' or attached in a network node, i.e. when the user stays for a prolonged period of time in a cell with relatively lower utilization. In such an instance, the recipient device 20 if enabled with location based services may send a Location update (LU) message updating its location in the operator network.
- The usage profiling data may be obtained either at the network node 14a (in the form of BTS) or at the link level. In such instances, a network management solution (NMS) may be integrated with the activity profile server 16 to receive usage information. This can further be integrated to a broadcasting system. Together with the LU information, the recipient devices attached or camped to the particular network elements at any given time may be determined.
- The activity profile server 16 may be separated for partitioning or redundancy purposes. However, having a single activity profile server 16 as described in the preferred embodiment in the system maintains visibility.
- The system 10 may be adapted to work for peer to peer if nodes 14 are not network elements such as BTS but messaging elements that handle particular groups of users.

The invention claimed is:

1. A system for routing electronic content to a recipient device comprising:
   a plurality of network nodes, each network node adapted to receive and forward electronic content and to the recipient device or another network node to relay the electronic content toward the recipient device and an activity profile server adapted to be in data communication with each network node, the activity profile server adapted to monitor the activity level of each network node and inform each network node on the congestion level of an adjacent network node;

the activity profile server further adapted to monitor the activity profile of the recipient device so as to determine a suitable delivery time of the electronic content from the network node to the recipient device;

and each network node is further adapted, on receiving the information on congestion level of the adjacent network node or the activity profile of the recipient device, to forward electronic content if the adjacent network node is not congested or if it is a suitable delivery, time for the recipient device, and store the electronic content to the adjacent network node if otherwise;

wherein electronic content is delivered to the recipient device upon detection that the recipient stays for a prolonged period of time in a network node with relatively lower utilization.

2. The system according to claim 1, wherein the activity level of the network node is monitored based on a historical utilization rate of each network node from a network management system or the non-peak usage times based on tracked revenue activities.

3. The system according to claim 1 or 2, wherein the recipient device is a mobile device comprising at least one gyroscopic sensor for monitoring the activity profile.

4. The system according to claim 1, wherein the activity profile server is adapted to schedule a deferred delivery for the adjacent network node at a time period corresponding to a time period of low activity of the adjacent network node.

5. The system according to claim 1 or 4, wherein the deferred delivery is scheduled based on a profile of least congestion where a period of low activity could not be found.

6. The system according to claim 1, wherein a deferred delivery is scheduled to the recipient device at a time period corresponding to a time period of idleness of the recipient device.

7. The system according to claim 6, wherein the deferred delivery is scheduled based on a period of low activity of the recipient device in the event when no period of idleness is found.

8. The system according to claim 7, wherein the electronic content is broken into a plurality of smaller packets.

9. The system according to claim 1, wherein the electronic content comprises a trigger to unpack the electronic content at a specified time or event.

10. The system according to claim 1, wherein electronic content below a certain threshold is delivered to the recipient device regardless of activity level of the recipient device.

11. A method of routing electronic content to a recipient device within a network having a plurality of network nodes comprising:

receiving at a network node electronic content from a source;

receiving at the network node information for scheduling transmission of the electronic content to a destination; and scheduling transmission of the received electronic content to the destination based on the information for scheduling transmission, and storing the received electronic content when the transmission is deferred, wherein if the destination is the recipient device, the information for scheduling transmission comprises information on an activity profile of the recipient device; and if the destination is another network node adjacent to the first network node, the information for scheduling transmission comprises information on a probability of congestion of the second network node over a period of time;

wherein electronic content is delivered to the recipient device upon detection that the recipient stays for a prolonged period of time in a network node with relatively lower utilization.

12. The method according to claim 11, wherein the probability of congestion is determined based on a historical utilization rate of the second network node from a network management system or non-peak usage times based on tracked revenue activities.

13. The method according to claim 11, wherein the recipient device is a mobile device comprising at least one gyroscopic sensor.

14. The method according to claim 11, wherein the method includes scheduling a deferred forwarding of the electronic content to the adjacent network node at a time period corresponding to a time period of low activity of the adjacent network node.

15. The method according to claim 11 or 14, wherein the deferred forwarding is scheduled based on a profile of least congestion where a period of low activity could not be found.

16. The method according to claim 11, wherein the method includes scheduling a deferred forwarding of the electronic content to the recipient device at a time period corresponding to a time period of idleness of the recipient device.

17. The method according to claim 16, wherein the deferred forwarding is scheduled based on a period of low activity of the recipient device in the event where no period of idleness is found.

18. The method according to claim 17, wherein the electronic content is broken into a plurality of smaller packets prior to scheduling for deferred forwarding.

19. The method according to claim 11, wherein the electronic content comprises a trigger to unpack the electronic content at a specified time or event.

20. The method according to claim 12, wherein electronic content below a certain threshold is delivered to the recipient device regardless of activity level of the recipient device.

* * * * *